July 14, 1925.  
C. G. GUIGNARD ET AL  
1,545,759  
APPARATUS FOR CONVEYING AND SEALING PACKAGES  
Filed Aug. 19, 1924  
2 Sheets-Sheet 1
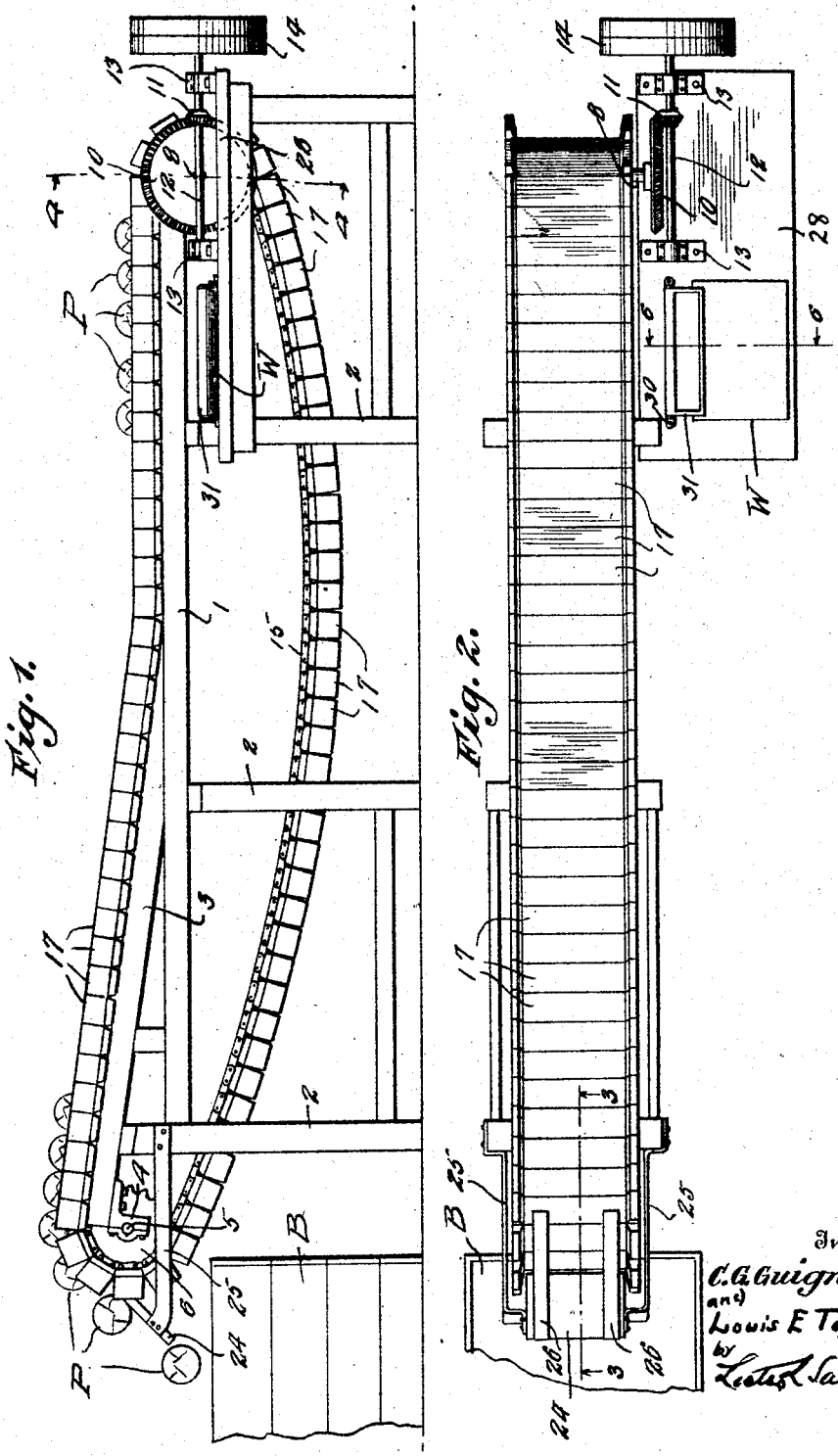

July 14, 1925. 1,545,759
C. G. GUIGNARD ET AL
APPARATUS FOR CONVEYING AND SEALING PACKAGES
Filed Aug. 19, 1924 2 Sheets-Sheet 2
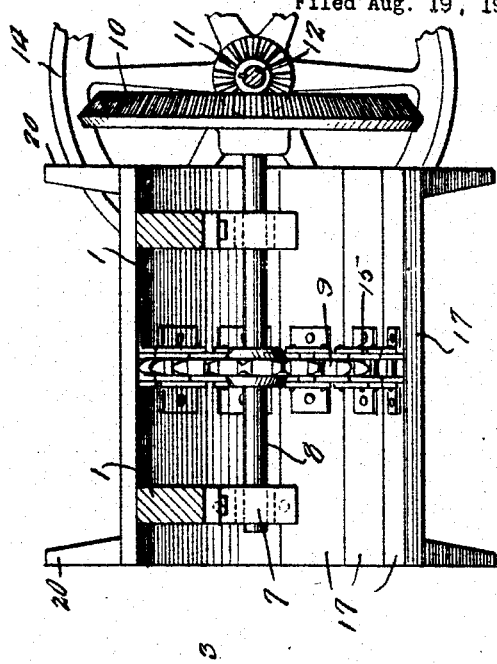
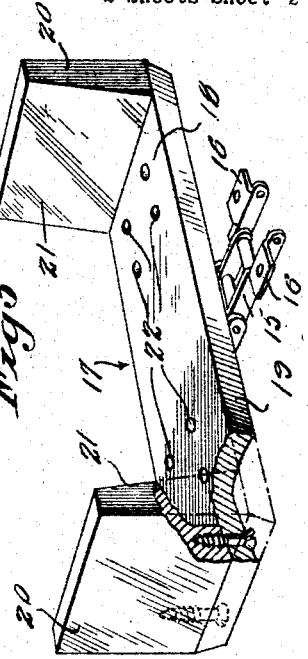
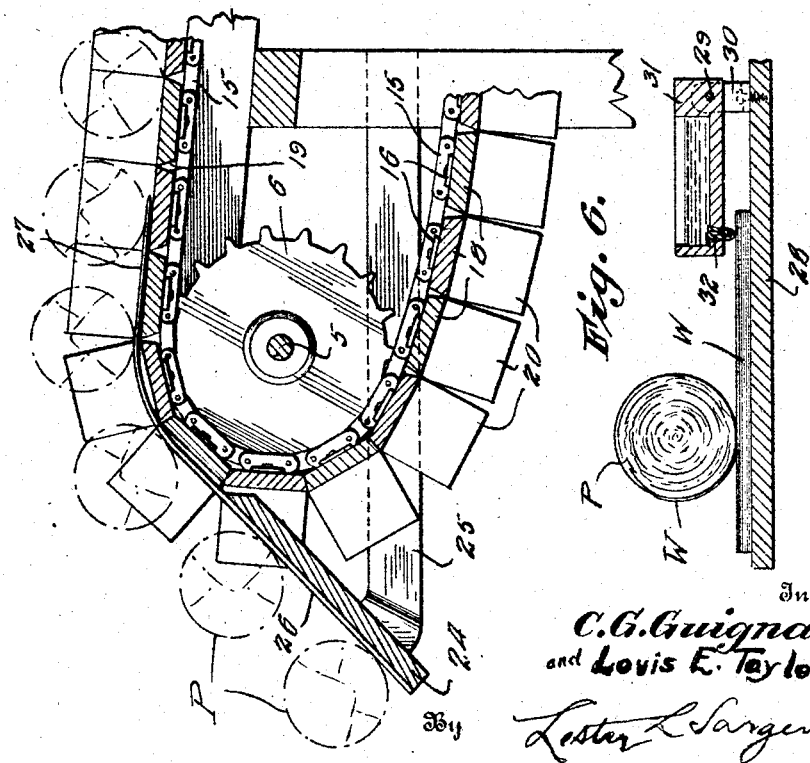
Inventor
C. G. Guignard
and Louis E. Taylor
By Lester L. Sargent
Attorney Patented July 14, 1925.

1,545,759

UNITED STATES PATENT OFFICE.

CHRISTOPHER G. GUIGNARD AND LOUIS E. TAYLOR, OF COLUMBIA, SOUTH CAROLINA.

APPARATUS FOR CONVEYING AND SEALING PACKAGES.

Application filed August 19, 1924. Serial No. 733,016.

*To all whom it may concern:*

Be it known that we, CHRISTOPHER G. GUIGNARD and LOUIS E. TAYLOR, citizens of the United States, residing at Columbia, in the county of Richland and State of South Carolina, have invented a new and useful Apparatus for Conveying and Sealing Packages, of which the following is a specification.

The object of our invention is to provide a novel flexible conveyer for conveying cylindrical packages and for holding the end flaps of the wrappers of the packages in closed position for a sufficient period to allow the freshly applied glue on these flaps to stick and seal the packages which, when they reach the end of the conveyer, are delivered in a sealed condition. We attain the objects of our invention by the mechanism illustrated in the accompanying drawings, in which—

Figure 1 is a side elevation of my invention;

Fig. 2 is a top plan of same;

Fig. 3 is a detail longitudinal sectional view on line 3—3 of Fig. 2;

Fig. 4 is a detail transverse sectional view through the conveyer;

Fig. 5 is a detail perspective view of one of the sections of the conveyer;

Fig. 6 is a detail sectional view of the glue-pot and table on line 6—6 of Fig. 2.

Like characters of reference indicate like parts throughout the several views.

Referring to the accompanying drawings we provide longitudinal beams 1 mounted on supporting legs 2, and we also provide inclined beams 3 extending upward toward one end of the longitudinal beams 1, as shown in Fig. 1. We further provide bearings 4 attached to one end of inclined beams 3 and on which bearings the lateral shaft 5 is mounted. Shaft 5 carries the sprocket wheel 6 which meshes with endless sprocket chain 15 which chain also is carried by the sprocket 9, said sprocket 9 being mounted on a shaft 8 carried by bearings 7, the shaft 8 also carrying a gear 10 which is driven by gear 11 on shaft 12, which shaft is mounted in bearings 13, as shown in Fig. 1, and carries the tight and loose pulley wheels 14 which are belted to any suitable source of power. On alternate links of sprocket chain 15 we provide opposite ears 16 which are suitably affixed to the slats or baseboard 18 of the package carrying members 17.

The package carrying members 17 consist of spaced detachable end pieces 20 each having a slightly beveled inner face 21. The end pieces 20 are screwed to the slat or baseboard 18, as shown in Fig. 5, and the inclination of faces 21 permits of easy insertion of the wrapped packages P. The slats 18 are preferably provided with a plurality of spaced apertures 22 to permit of convenient adjustment of end pieces 20 for different sizes of packages.

At the delivery end of the conveyer we provide a suitable delivery chute 26 mounted in any suitable manner as on the inclined guide plate 24 carried by the brackets 25, as shown in Fig. 3. The delivery chute 26 has its free end extending into the conveyer a suitable distance to disengage the packages from the end pieces 21 so that they will slide upon the chute readily as the conveyer moves on, in the manner illustrated in Fig. 3. We provide a suitable bin B into which the packages are deposited from chute 26, in the manner shown in Fig. 1. At the receiving end of the conveyer we provide a suitable table 28 on which is mounted a suitable glue pot 31 mounted on member 29 which is carried by the brackets 30. Glue pot 31 has a wicking 32, as shown in Fig. 6.

In using the invention, the operator stands behind table 28 and draws one sheet of the wrapping paper W at a time from the pile. The wrapping paper is positioned under the wicking 32 so that the necessary glue flows onto the end portion of the wrapping paper which is wrapped by the operator around the cylindrical package P of absorbent cotton. The wrapping paper is suitably folded at the end to form flaps, to the inner portion of which glue is applied by a brush. The package is then quickly deposited by the operator between the end pieces 20 of one of the carrying members 17. Repeating this procedure the operator deposits a whole series of packages in the conveyer as it travels slowly along, the conveyer carrying the packages and allowing the glue to dry so that when the packages reach the delivery or discharge end of the conveyer the glue has dried sufficiently to seal the packages securely and the packages ride up on the delivery chutes 26 and roll down into the receiving bin B. The endless conveyer is operated by the sprocket chain 15 which rides on the sprocket wheels 6 and 9, one of these sprockets being operatively connected with a suitable source of power by suitable means such as illustrated in Figs. 1, 2 and 4 of the drawing.

What we claim is:

1. An apparatus for conveying and gripping freshly glued packages consisting of a conveyor formed of series of carrying members each of these carrying members comprising a baseboard, spaced upright end pieces having slightly outwardly inclined inner faces to contact with the ends of the freshly sealed packages and hold them in clamped position, a sprocket chain to which the said carrying members are independently attached, means for driving the sprocket chain, and an inclined delivery chute, said chute having a portion thereof extending into the delivery end of the conveyor.

2. In an apparatus for conveying and gripping freshly glued packages, the combination of a series of baseboards, opposite end pieces mounted on each of said baseboards, the end pieces being largest at their base and having their inner faces inclined outwardly to engage the ends of the freshly sealed packages and hold them in clamped position, said baseboards being of approximately the same width as the packages to be sealed, a sprocket chain to alternate links of which the baseboards are affixed, said baseboards, end pieces and sprocket chain forming a conveyor, and means for mounting and driving the sprocket chain.

3. In an apparatus for conveying and gripping freshly glued packages, the combination of a series of carrying members of suitable size and shape to engage and hold the ends of packages while the freshly applied glue is drying, a sprocket chain on spaced links of which said carrying members are independently affixed, means for mounting and driving said sprocket chain, and a delivery chute having a portion thereof extending into the delivery end of the conveyor for the purposes described.

CHRISTOPHER G. GUIGNARD.
LOUIS E. TAYLOR.